(12) United States Patent
Yao et al.

(10) Patent No.: US 10,695,904 B2
(45) Date of Patent: Jun. 30, 2020

(54) BIONIC PNEUMATIC SOFT GRIPPING DEVICE

(71) Applicant: Yanshan University, Qinhuangdao (CN)

(72) Inventors: Jiantao Yao, Qinhuangdao (CN); Haili Li, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 151 days.

(21) Appl. No.: 16/115,641

(22) Filed: Aug. 29, 2018

(65) Prior Publication Data

US 2019/0184552 A1 Jun. 20, 2019

(30) Foreign Application Priority Data

Dec. 19, 2017 (CN) .................... 2017 1 13706454
Apr. 2, 2018 (CN) .................... 2018 1 02835672

(51) Int. Cl.
| | |
|---|---|
| *B25J 9/06* | (2006.01) |
| *B25J 15/00* | (2006.01) |
| *B25J 9/00* | (2006.01) |
| *B25J 15/12* | (2006.01) |

(52) U.S. Cl.
CPC ............. *B25J 9/065* (2013.01); *B25J 9/0015* (2013.01); *B25J 15/0019* (2013.01); *B25J 15/0023* (2013.01); *B25J 15/12* (2013.01)

(58) Field of Classification Search
CPC ....... B25J 9/065; B25J 9/0015; B25J 15/0019
USPC ............................... 294/119.3, 98.1; 206/545
See application file for complete search history.

(56) References Cited

U.S. PATENT DOCUMENTS

| | | | | |
|---|---|---|---|---|
| 2,852,045 A | * | 9/1958 | Goodner ................. | B65B 39/08 141/314 |
| 3,015,142 A | * | 1/1962 | Rosanoff ............. | E02B 17/0845 294/86.4 |
| 3,561,330 A | * | 2/1971 | Rich ....................... | B25B 5/061 92/92 |
| 3,695,757 A | * | 10/1972 | Gregory ................. | B65D 39/08 399/159 |
| 3,913,307 A | * | 10/1975 | Cardinal, Jr. ........ | A01D 46/005 56/328.1 |
| 4,108,486 A | * | 8/1978 | Hirmann ................ | B23D 15/14 294/119.3 |
| 5,083,824 A | * | 1/1992 | Sato ...................... | B65G 47/908 294/119.3 |

(Continued)

*Primary Examiner* — Paul T Chin
(74) *Attorney, Agent, or Firm* — IPro, PLLC

(57) ABSTRACT

A bionic pneumatic soft gripping device includes a flexible sleeve, a connecting base, a pneumatic artificial muscle, a flexible holder, and a gap tube. The flexible sleeve is an annular jacket-like structure. The flexible holder is a tubular hollow structure having openings at both ends thereof. The pneumatic artificial muscle is wound on the flexible holder. The flexible sleeve is sleeved on the flexible holder connected with the pneumatic artificial muscle through the opening of the flexible sleeve. The pneumatic artificial muscle is connected to a tube joint via a fastening sleeve, and the tube joint is connected to the gap tube. The bionic pneumatic flexible gripping device of the present disclosure has advantages of large gripping force and compliancy, thereby effectively gripping objects in various shapes within its gripping size range.

13 Claims, 10 Drawing Sheets

(56) References Cited

U.S. PATENT DOCUMENTS

| | | | | |
|---|---|---|---|---|
| 5,245,885 A | * | 9/1993 | Robertson | B25J 15/0009 294/119.3 |
| 5,704,579 A | * | 1/1998 | Celentino | B60N 3/101 248/311.2 |
| 6,302,364 B1 | * | 10/2001 | Chiueh | B60N 3/10 206/545 |
| 6,637,617 B2 | * | 10/2003 | Eisenbraun | B60N 3/103 220/720 |
| 8,894,115 B2 | * | 11/2014 | Lundman | B66D 1/60 294/119.3 |
| 10,022,877 B2 | * | 7/2018 | Wang | B25J 18/06 |

* cited by examiner

BIONIC PNEUMATIC SOFT GRIPPING DEVICE

TECHNICAL FIELD

The present disclosure belongs to a technical field of a robot end effector, and particularly to a bionic pneumatic soft gripping device.

BACKGROUND

In recent years, with development of the robotics, the soft grippers have been used widely. The soft grippers have advantages of compliancy, flexibility, and safety, and thereby being widely used in the fields such as loading and unloading of industrial products, military robots, agricultural robots and service robots. With respect to a drive mode, the soft grippers includes a motor drive, a gas-liquid drive and a functional material drive and etc., wherein the soft grippers of the motors drive have a better control performance; the soft grippers of the gas-liquid drive have a better compliancy, air source is convenient and the weight is light, and thereby being widely used in the light soft grippers; functional material drive performs driving by using shape memory alloys, ultrasonic wave, high polymer and functional liquid, and has an unique advantage in an application requesting the soft grippers small and light weighted.

SUMMARY

In one aspect of the present disclosure, a bionic pneumatic soft gripping device is disclosed. It comprises a flexible sleeve, a connecting base, a pneumatic artificial muscle, a flexible holder, and a gas tube, wherein the flexible holder is a tubular revolving structure opening at both ends; an inner diameter of an upper section tubular cylinder of the flexible holder is smaller than an inner diameter of a lower section tubular cylinder of the flexible holder; the upper section tubular cylinder and the lower section tubular cylinder are connected through a truncated cone shell; four to nine columns of vertically-arrayed circular through holes equal in diameter are uniformly arranged in a circumferential direction on a tubular wall of the lower section tubular cylinder; wherein an upper connecting through hole and a lower connecting through hole are respectively arranged on the tubular wall of the lower section tubular cylinder; the flexible holder is provided with two fixing pieces located respectively on an inner side and an outer side of each of the connecting through holes; the fixing piece is an arc-shaped sheet made of a metal material and is provided with a central through hole in the middle thereof that is equal in diameter with the connecting through holes of the flexible holder; and a fastener mounting hole is respectively provided on either side of the central through hole; the two fixing pieces are fixed on the flexible holder by means of a fastener in the fastener mounting hole; a vent joint of the pneumatic artificial muscle is provided in the central through hole of the fixing piece; sealing joints of the pneumatic artificial muscle are provided in the central through holes of the two fixing pieces below; internal threads of the vent joint of the pneumatic artificial muscle are connected with a threaded joint on one end of the gas tube; the vent joint of the pneumatic artificial muscle penetrates out of the connecting through hole with the fixing pieces on an upper end of the flexible holder, so that a flexible section of the pneumatic artificial muscle and the flexible holder together form a spiral winding bionic structure; wherein the spiral winding bionic structure is sleeved from outside with the flexible sleeve; the flexible sleeve is an annular jacket-like structure that has an opening on an upper end thereof and is made of a silicone material, and has a cylindrical space at the center thereof; through holes corresponding to the vent joints of the pneumatic artificial muscle are provided on an upper portion of an outer sidewall of the flexible sleeve; wherein the spiral winding bionic structure and the upper portion of the flexible sleeve are sleeved on a large-diameter circumferential wall of a connecting base; one end of a small-diameter circumferential wall of the connecting base is provided with a flange disk.

Preferably, wherein a diameter of the circular through hole is larger than a diameter of the pneumatic artificial muscle in a maximum contraction state by 2-4 mm; central axes of the circular through holes in each column are on the same generatrix of a cylindrical surface of the tubular wall, while all of the circular through holes are circumferentially arranged along a spiral line; and a distance between central lines of two adjacent circular through holes in each column is 2-3 times of the diameter of the circular through hole; and the flexible holder is made of a silicone material.

Preferably, wherein a center of the vent joint is provided an axial through hole that is provided with internal threads and external threads; external threads are provided on one end of the sealing joint; the sealing joint has an outer end that penetrates out of the connecting through hole with the fixing pieces of the flexible holder, and an inner end that is connected with the flexible section of the pneumatic artificial muscle; the other end of the pneumatic artificial muscle penetrates from the inner side of the flexible holder along the spiral line out of a first circular through hole of the circular through holes on the lower end of the column adjacent to the connecting through hole, and penetrates into a first circular through hole of the circular through holes in the next column from the outer side of the flexible holder in the same clockwise direction; the pneumatic artificial muscle penetrates in and out till back to a second circular through hole of the circular through holes in the column provided with the connecting through hole, and continuously through a second circular through hole of the circular through holes in the next column in the same manner.

Preferably, wherein the connecting base is a revolving shell-type structure made of a metal material; one end of a large-diameter circumferential wall of the connecting base is connected to the flexible sleeve; and the flange disk is provided with U-shaped slots uniformly arranged in the circumferential direction.

Preferably, wherein the pneumatic artificial muscle is a woven-mesh contractible-type flexible driver; the flexible section of the pneumatic artificial muscle is a layer of woven mesh sleeved outside of a highly elastic latex tube; the flexible section has one end on which the vent joint of the metal material is provided and the other end on which the sealing joint of the metal material; and the two ends of the flexible section are locked by using a locking ring.

Preferably, wherein either of the vent joint and the sealing joint is provided with a rib on one end thereof within the flexible section, and provided with a smooth shaft section and a shoulder in an axial middle portion thereof.

Preferably, wherein the large-diameter circumferential wall of the connecting base is provided with a rib, and the spiral winding bionic structure and the flexible sleeve are fixed on the rib by means of a clip.

On the other hand, the present disclosure provides a bionic pneumatic soft gripping device. It comprises a flexible sleeve, a gas tube, a connecting base, a flexible holder, a pneumatic artificial muscle, a fastening sleeve and a tube joint; wherein the flexible sleeve is an annular jacket-like structure configured to ensure a friction force between the flexible sleeve and an object to be grasped within a preset range; a center of the flexible sleeve is a cylindrical structure with an opening at a first end thereof; wherein the flexible holder is a tubular hollow structure opening at both ends thereof and includes a first section tubular hollow member, a second section tubular hollow member and a third section tubular hollow member; an inner diameter of the first section tubular hollow member is smaller than an inner diameter of the third section tubular hollow member, and the first section tubular hollow member and the third section tubular hollow member are connected by the second section tubular hollow member in a shape of a truncated cone; wherein the connecting base has a first end connected to the flexible holder and a second end connected to the flange disk; wherein the pneumatic artificial muscle is wound on the flexible holder; the flexible sleeve is sleeved on the flexible holder connected with the pneumatic artificial muscle through the opening of the flexible sleeve; a cylindrical structure at a center of the flexible sleeve is used to receive and grip the object to be grasped; the flexible sleeve is fixed to the connecting base by means of a clip; the pneumatic artificial muscle is connected to the tube joint by means of the fastening sleeve; the tube joint is connected to the gas tube; a first through hole corresponding to a vent joint of the pneumatic artificial muscle is provided on an outer sidewall of the flexible sleeve; the gas tube is projected from inside of the flexible sleeve; gripping or releasing operation is realized by inflating or deflating gas to the pneumatic artificial muscle via the gas tube; wherein the pneumatic artificial muscle comprises a latex tube, a woven mesh tube, and a joint; the joint is a rigid structure; the woven mesh tube is sleeved on a periphery of the latex tube; two ends of the woven mesh tube and the latex tube are fixedly mounted on the joint; the woven mesh tube is made of reinforced fibers; the pneumatic artificial muscle forms an annular closed structure on the flexible holder to form a multi-point contact force for enclosing gripping; wherein in an inflated state, the pneumatic artificial muscle tightens the flexible sleeve and the flexible holder to allow an internal cavity of the pneumatic artificial muscle to form pleats and projections for blocking the grasped object; and an inner diameter of the first section tubular hollow member is 60% of an inner diameter of the third section tubular hollow member.

Preferably, wherein the connecting base comprises a revolving shell, and U-shaped slots uniformly arranged in a circumferential direction are arranged on an edge of the flange disk; the connecting base is a rigid structure made of a metal material.

Preferably, wherein second through holes are provided on a sidewall of the third section tubular hollow member; a diameter of the second through hole is larger than a diameter of the pneumatic artificial muscle so that the pneumatic artificial muscle penetrates in and out of the second through holes; wherein the second through holes are circular through holes equal in diameter and uniformly arranged in N rows and M columns along a circumferential direction of the sidewall of the third section tubular hollow member; wherein at least one set of pneumatic artificial muscles are arranged in parallel in an axial direction of the third section tubular hollow member; the pneumatic artificial muscles respectively penetrate in and out of two second through holes adjacent to each other within a plane in which the respective pneumatic artificial muscles are located in perpendicular to an axis of the third section tubular hollow member; each of the pneumatic artificial muscles goes back and forth like a snake through each of the second through holes on the flexible holder in a row on which the respective pneumatic artificial muscles are located, until head portions and tail portions of the respective pneumatic artificial muscles are connected; wherein two ends of each of the pneumatic artificial muscles are fixed on a corresponding first interface on the tube joint by the fastening sleeves, respectively; the tube joint is provided with a second interface connected with the gas tube; the tube joint has 2N+1 interfaces communicated with each other; wherein the number of the first interfaces is 2N, and the number of the second interfaces is at least one, such that a gas source can be replaced immediately when the gas source connected to a first gas tube occurs malfunction.

Preferably, wherein arc-shaped semi-circular holes are provided on the sidewall of the third section tubular hollow member; a diameter of the arc-shaped semi-circular hole is larger than a diameter of the pneumatic artificial muscle so that the pneumatic artificial muscle penetrates in and out of the arc-shaped semi-circular hole; wherein the arc-shaped semi-circular holes are arranged in N rows and M columns along the circumferential direction of the sidewall of the third section tubular hollow member in an axial direction of the third section tubular hollow member; a first arc-shaped semi-circular hole in a transitional column is arranged transversally, and the rest of arc-shaped semi-circular holes in the transitional column are arranged obliquely; the pneumatic artificial muscle is a long tube, which passes through the individual arc-shaped semi-circular holes on a first row of the flexible holder in turn starting from the first arc-shaped semi-circular hole of the transitional column, and through the rest of arc-shaped semi-circular holes arranged obliquely in the transitional column, and passes through the arc-shaped semi-circular holes on a second row, and so forth, passes through all the arc-shaped semi-circular holes till to pass through the arc-shaped semi-circular hole at the end; wherein both ends of the pneumatic artificial muscle are respectively fixed on two first interfaces on both ends of the tube joint via the fastening sleeve; a second interface connected with the gas tube is provided on the tube joint; the tube joint has three joints communicated with each other; a hollow structure is provided at the sidewall of the flexible holder corresponding to the position in which the arc-shaped semi-circular hole is provided; the tube joint comprises a first portion, a second portion, and a third portion; the first portion is a straight tube, and the second portion and the third portion are bent tubes; wherein an end of the second portion is in a direction opposite to an end of the third portion; two ends of the pneumatic artificial muscle are respectively connected to the end of the second portion and the end of the third portion via the fastening sleeves, in order to reduce deformation of the pneumatic artificial muscle, such that the gas can smoothly flow within the pneumatic artificial muscle.

Preferably, wherein the second portion includes a first section, a second section, and a third section; the second section is arranged perpendicular to the first section; the third section is arranged perpendicular to the first section; a plane in which the first section and the second section are located does not coincide with a plane where the first section and the third section are located; and there is an included angle between the two planes.

Preferably, wherein arc-shaped semi-circular holes are provided on the sidewall of the third section tubular hollow member; a diameter of the arc-shaped semi-circular hole is larger than a diameter of the pneumatic artificial muscle so that the pneumatic artificial muscle penetrates in and out of the arc-shaped semi-circular holes; wherein the arc-shaped semi-circular holes are uniformly arranged in N rows and M columns along the circumferential direction of the sidewall of the third section tubular hollow member in an axial direction of the third section tubular hollow member; wherein a hollow structure is provided at a sidewall of the flexible holder corresponding to the position where the arc-shaped semi-circular hole is provided; the flexible holder is wound by N pneumatic artificial muscles arranged in parallel; the respective pneumatic artificial muscles in turn pass through the respective arc-shaped semi-circular holes on a corresponding row of the flexible holder, until each of the pneumatic artificial muscles is connected from a head portion to a tail portion; wherein both ends of the pneumatic artificial muscle are respectively fixed on two corresponding first interfaces on the tube joints by the fastening sleeves, respectively; the tube joint is provided with a second interface connected with the gas tube; wherein the tube joint has 2N+1 interfaces communicated with each other; the number of the first interfaces is 2N, and the number of the second interfaces is at least one, such that a gas source can be replaced immediately when the gas source connected to the corresponding gas tube occurs malfunction.

The present disclosure employs a winding structure of a woven mesh reinforced pneumatic artificial muscle, which can achieve contraction and relaxation of an internal cavity of the gripping device in a process of inflation and deflation, to cooperate with the robot to complete gripping and releasing operation. A main body of the gripping structure of the bionic pneumatic soft gripping device according to the present disclosure is made of flexible materials, such as silicone, latex tube, fiber, to achieve non-destructive gripping and make man-machine safety. The bionic pneumatic soft gripping device according to the present disclosure is designed in a modular manner, and can be manufactured by simply assembling the parts and can be easily maintained and replaced. The bionic pneumatic soft gripping device according to the present disclosure has a large gripping force, and a good compliancy, and can effectively grip the objects in various shapes within the gripping sizes, and thereby can be used widely.

DETAILED DESCRIPTION

Figure 1:
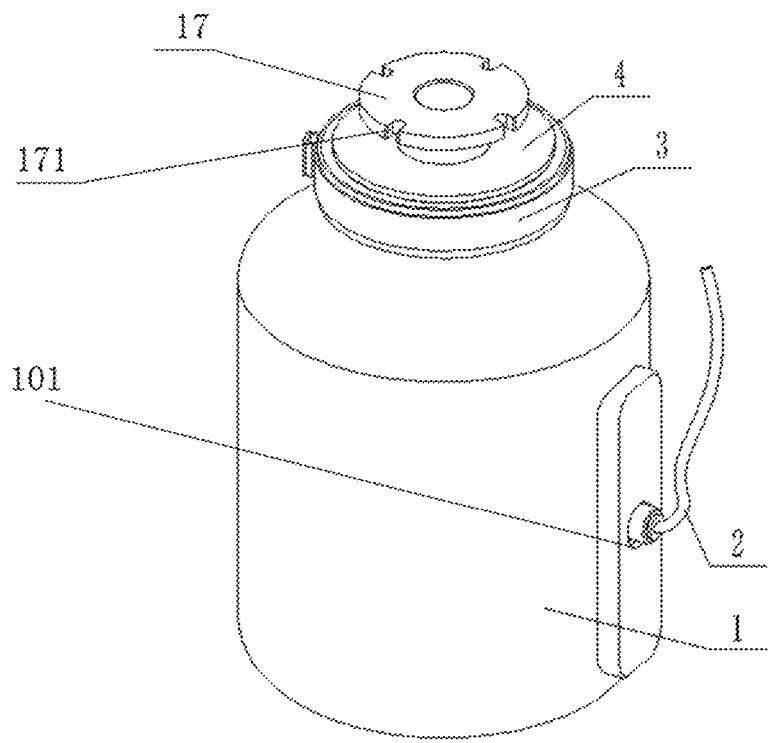
FIG. 1 is a schematic structural view of a bionic pneumatic soft gripping device according to the present disclosure.

Hereinafter, the present disclosure will be described in detail with reference to the accompanying drawings.

A bionic pneumatic soft gripping device according to the present disclosure has a basic gripping principle of imitating a hunting method of entangled animals, for example, a boa entangles a prey tightly through contraction and curling of its body. The present disclosure employs a winding structure of a woven mesh reinforced pneumatic artificial muscle, which can achieve contraction and relaxation of an internal cavity of the gripping device in a process of inflation and deflation, to cooperate with the robot to complete gripping and releasing operation.

FIG. 1 to FIG. 10 show that the bionic pneumatic soft gripping device according to the present disclosure includes a flexible sleeve 1, a pipe 2, a connecting base 4, a flexible holder, pneumatic artificial muscle, a fastening sleeve, and a tube joint.

The tube joint is a rigid structure.

The connecting base 4 is a rigid structure. The connecting base 4 has one end (for example, the first end) that is connected to a flexible holder, and the other end (for example, the second end) that is connected to a flange disk 17. The pneumatic artificial muscle is wound around the flexible holder, and is sleeved by the flexible sleeve 1 at the periphery thereof. The flexible sleeve 1 is fixed to the connecting base 4 by the clip 3. The pneumatic artificial muscle is connected to the tube joint through the fastening sleeve. The tube joint is provided with the gas tube 2. The pneumatic artificial muscle is inflated and deflated by the gap tube to achieve gripping and picking up operations of the device.

Preferably, the fastening sleeve is an annular metal foil.

The flexible sleeve 1 is an annular jacket-like structure configured to ensure a friction force between it and an object to be grasped within a preset range. A center of the flexible sleeve 1 is a cylindrical structure with an opening 100 at a first end thereof, through which the flexible sleeve 1 is attached to a flexible holder connected with the pneumatic artificial muscle. The cylindrical structure at the center of the flexible sleeve 1 is used to receive and grip the object.

The pneumatic artificial muscle is a woven mesh reinforced structure, which includes a latex tube, a woven mesh tube, and a joint. The joint is a rigid structure. The woven mesh tube is sleeved on a periphery of the latex tube. Two ends of the latex tube and the woven mesh tube are fixedly mounted on the joint. The woven mesh tube is made of reinforced fibers that can provide a larger contracting force. The pneumatic artificial muscle forms an annular closed structure on the flexible holder to form a multi-point contact force for enclosing gripping. In an inflated state, the pneumatic artificial muscle has axial contraction and radial expansion under the action of gas, the internal cavity of the pneumatic artificial muscle forms pleats and projections for blocking the grasped object. The pneumatic artificial muscle after inflation has a higher rigid to withstand a preset load and a large preset load.

A first through hole 101 corresponding to a vent joint of the pneumatic artificial muscle is provided on the outer sidewall of the flexible sleeve 1, through which the gas tube 2 is projected from the inside of the flexible sleeve 1.

Preferably, the flexible sleeve is made of a silicone material or a rubber material.

Preferably, each rigid structure member is made of a metal material.

The connecting base 4 is a revolving shell-type structure, and an edge of the flange disk 17 is provided with U-shaped slots 171 uniformly distributed in the circumferential direction thereof.

Preferably, the flange disk 17 is a rigid structure.

The pneumatic artificial muscle is connected to a flexible holder.

Preferably, the flexible holder is provided with holes uniformly arranged along the circumferential direction of the holder.

The connecting base 4 has a first surface having a first diameter, and a second surface having a second diameter, and the first diameter is larger than the second diameter. The first surface is connected to the flexible sleeve, and the second surface is provided with a flange disk attached thereto.

According to one embodiment of the present disclosure, the bionic pneumatic soft gripping device of the present disclosure, as shown in FIG. 3, FIG. 4, FIG. 9 and FIG. 10, includes a flexible sleeve 1, a gas tube 2, a connecting base 4, a flexible holder 5, pneumatic artificial muscle 6, a fastening sleeve 7 and a tube joint 8. The flexible holder 5 is a tubular hollow structure that is open at both ends thereof. The flexible holder 5 includes first, second and third section tubular hollow members. An inner diameter of the first section tubular hollow member is smaller than an inner diameter of the third section tubular hollow member, and the first section tubular hollow member and the third section tubular hollow member are connected by a truncated cone shell, i.e., a second section tubular hollow member.

Preferably, the inner diameter of the first section tubular hollow member is 60% of the third section tubular hollow member.

Preferably, a second through hole 52 is provided on a sidewall of the third section tubular hollow member, and a diameter of the second through hole 52 is larger than a diameter of the pneumatic artificial muscle so that the pneumatic artificial muscle penetrates in and out of the second through hole 52.

Preferably, the second through holes 52 are an equal-diameter circular through holes that are arranged uniformly in N rows and M columns along the circumferential direction of the third section tubular hollow member on the sidewall of the third section tubular hollow member.

Preferably, arrangement and number of the second through holes 52 can be designed according to the size of the articles to be grasped and the working conditions.

The pneumatic artificial muscle 6 is wound on the flexible holder 5. The number of the pneumatic artificial muscle 6 is at least one, for example, the bionic pneumatic soft gripping device according to the embodiment of the present disclosure includes three pneumatic artificial muscles 6. Preferably, the respective pneumatic artificial muscles 6 are arranged in parallel in an axial direction of the third section tubular hollow member. The pneumatic artificial muscles 6 respectively penetrate in and out of two second through holes 52 adjacent to each other within a plane in which the pneumatic artificial muscle is located in perpendicular to an axis of the third section tubular hollow member, that is, each of the pneumatic artificial muscles 6 goes back and forth like a snake through each of the second through holes 52 on the flexible holder 5 in a row on which the respective pneumatic artificial muscles 6 are located, until the head portions and a tail portion of the pneumatic artificial muscles are connected with the tube joints 8, respectively.

The two ends of each pneumatic artificial muscle 6 are fixed on a corresponding first interface 81 on the tube joint 8 by the fastening sleeves 7, respectively. The tube joint 8 is provided with a second interface 21 connected with the gas tube 2. Preferably, the second interface 21 is disposed in the middle of the tube joint 8.

Preferably, the tube joint 8 is a pipe joint made of steel materials and has 2N+1 interfaces communicated with each other. The number of the first interfaces 81 is 2N, and the number of the second interfaces 21 is at least one, such that a gas source can be replaced immediately by closing and opening or closing the respective second interfaces when the gas source connected to the corresponding gas tube occurs a malfunction.

Further, a switching structure is respectively arranged at each of the second interfaces so as to open and close the corresponding gas source as required and when the malfunction occurs.

According to one embodiment of the present disclosure, one second interface connected to a gas tube is provided on one side of the tube joint 8 as shown in FIG. 3, FIG. 4 and FIG. 9 2N first interfaces 81 that have the same sizes and are connected with the interfaces on the two ends of the N pneumatic artificial muscles 6 are provided on the other side of the tube joint 8. The two first interface 81 as a set are respectively connected to a head portion and a tail portion of each pneumatic artificial muscle 6, and a distance between the two adjacent sets of the first interfaces is identical to a distance between the two adjacent pneumatic artificial muscles 6.

The flexible sleeve 1 wraps the flexible holder 5, the pneumatic artificial muscle 6, and the tube joint 8 therein, and is fixed on the connecting base by the clip 3. The gas tube connected to the tube joint 8 passes through the first through hole 101 of the flexible sleeve and protrudes outside.

Preferably, the flexible holder 5 is made of a silicone material. Preferably, the flexible holder 5 is made of a rubber material.

Preferably, the flexible sleeve 1 is provided with a groove 82 for accommodating the tube joint 8, and the first through hole 101 through which the gas tube passes is provided on the surface of the groove 82.

Figure 5:
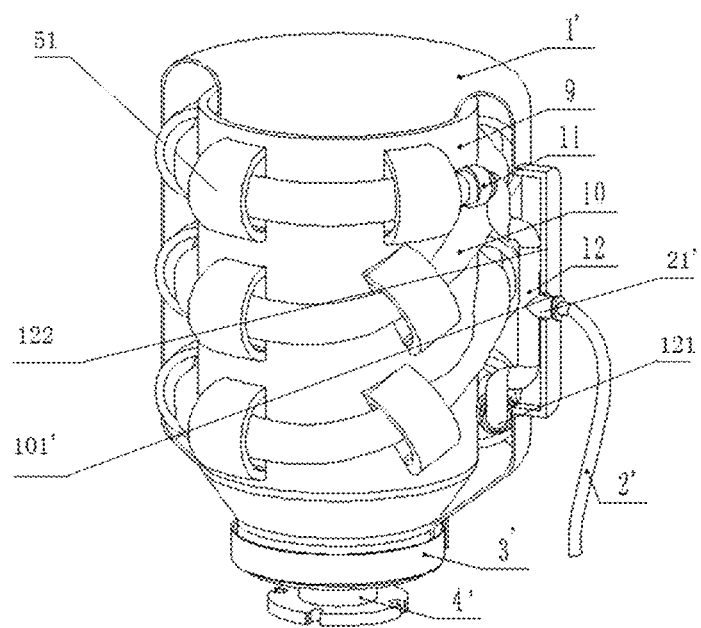
FIG. 5 is a schematic structural view of a tube joint of the bionic pneumatic soft gripping device according to the second embodiment of the present disclosure.
Figure 6:
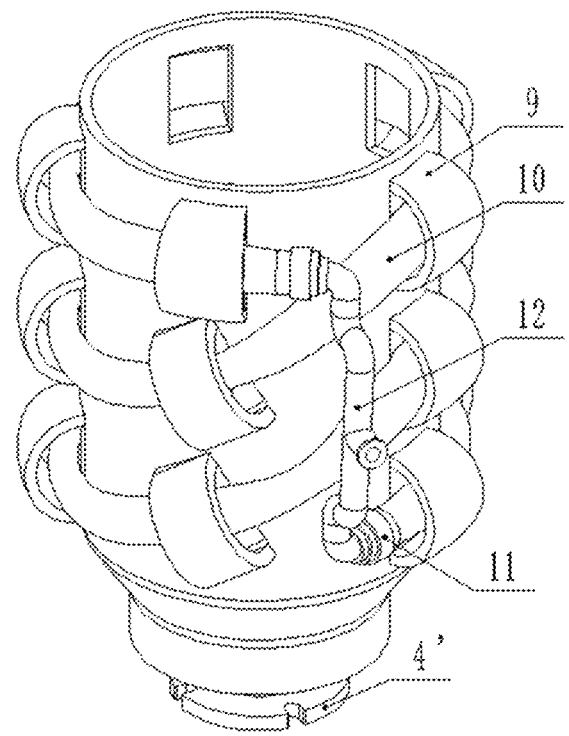
FIG. 6 is a schematic structural view of a connecting base of the bionic pneumatic soft gripping device according to the second embodiment of the present disclosure.

According to the second embodiment of the present disclosure, the bionic pneumatic soft gripping device, as shown in FIG. 5 and FIG. 6, includes a flexible sleeve 1', a gas tube 2', a connecting base 4', a flexible holder 9, a pneumatic artificial muscle 10, a fastening sleeve 11, and a tube joint 12.

Preferably, the flexible holder 9 is made of a silicone material or a rubber material.

The flexible holder 9 is a tubular hollow structure that is open at both ends thereof. The flexible holder 9 includes first, second and third section tubular hollow members. An inner diameter of the first section tubular hollow member is smaller than an inner diameter of the third section tubular hollow member, and the first section tubular hollow member and the third section tubular hollow member are connected by a truncated cone shell, i.e., a second section tubular hollow member.

Preferably, the inner diameter of the first section tubular hollow member is 60% of the third section tubular hollow member.

Preferably, an arc-shaped semi-circular hole 51, for example, an ear-shaped hole is provided on a sidewall of the third section tubular hollow member, and a diameter of the arc-shaped semi-circular hole 51 is larger than a diameter of the pneumatic artificial muscle so that the pneumatic artificial muscle passes through and out of the arc-shaped semi-circular hole 51.

Preferably, arrangement and number of the arc-shaped semi-circular hole 51 can be designed according to the size of the articles to be grasped and the working conditions.

Preferably, the arc-shaped semi-circular holes 51 are arranged in N rows and M columns along the circumferential direction of the sidewall of the third section tubular hollow member in an axial direction of the third section tubular hollow member.

Preferably, among one or two columns of arc-shaped semi-circular holes for transition, in addition to that the first arc-shaped semi-circular hole is arranged transversally, the other arc-shaped semi-circular holes are arranged obliquely.

Preferably, the pneumatic artificial muscle 10 is a long tube, which passes through the individual arc-shaped semi-circular holes 51 on the first row of the flexible holder 9 in turn starting from the first arc-shaped semi-circular hole of the transitional column, and through the transitional oblique arc-shaped semi-circular hole, and passes through the arc-shaped semi-circular hole on the second row, and so forth, passing through all the arc-shaped semi-circular holes till to pass through the arc-shaped semi-circular hole at the end. Both ends of the pneumatic artificial muscle 10 are respectively fixed on the two first interfaces 121 on both ends of the tube joint 12 via a fastening sleeve 11. A second interface 21' connected to the gas tube is provided in the middle of the tube joint 12. The tube joint 12 is a step-type pipe joint having three joints communicated with each other, in which the middle joint is a second interface 21' connected to the gas tube, and the joints at the two ends thereof are the first interfaces 121 connected to the two ends of the pneumatic artificial muscle 10.

Namely, an arc-shaped semi-circular hole is provided on the sidewall of the third section tubular hollow member. Preferably, a diameter of the arc-shaped semi-circular hole 51 is larger than a diameter of the pneumatic artificial muscle so that the pneumatic artificial muscle passes through and out of the arc-shaped semi-circular hole 51. The arc-shaped semi-circular holes 51 are arranged in N rows and M columns along the circumferential direction of the sidewall of the third section tubular hollow member in an axial direction of the third section tubular hollow member. The first arc-shaped semi-circular hole in the transitional column is arranged transversally, and the other arc-shaped semi-circular holes in the transitional column are arranged obliquely. The pneumatic artificial muscle is a long tube, which passes through the individual arc-shaped semi-circular holes on the first row of the flexible holder in turn starting from the first arc-shaped semi-circular hole of the transitional column, and through the transitional oblique arc-shaped semi-circular hole, and passes through the arc-shaped semi-circular hole on the second row, and so forth, passing through all the arc-shaped semi-circular holes till to pass through the arc-shaped semi-circular hole at the end. Both ends of the pneumatic artificial muscle are respectively fixed on the two first interfaces on both ends of the tube joint via the fastening sleeve. The second interface connected with the gas tube is provided on the tube joint. The tube joint has three joints communicated with each other. A hollow structure is provided at the sidewall of the flexible holder corresponding to the position in which the arc-shaped semi-circular hole is provided.

The tube joint 12 includes a first portion, a second portion, and a third portion. The first portion is a straight tube, and the second portion and the third portion are bent tubes. An end of the second portion is in a direction opposite to an end of the third portion. Two ends of the pneumatic artificial muscle 10 are respectively connected to the end of the second portion and the end of the third portion via the fastening sleeves 11 in order to form an annular closed structure, and the gas can smoothly flow within the pneumatic artificial muscle 10.

Preferably, the second portion includes a first section, a second section, and a third section. The second section is arranged perpendicular to the first section, the third section is arranged perpendicular to the first section, and a plane in which the first section and the second section are located does not coincide with a plane where the first section and the third section are located, preferably, there is an included angle between the two planes.

Preferably, the third portion includes a first section, a second section, and a third section. The second section is arranged perpendicular to the first section, the third section is arranged perpendicular to the first section, and a plane in which the first section and the second section are located does not coincide with a plane where the first section and the third section are located, preferably, there is an included angle between the two planes.

The flexible sleeve 1' wraps the flexible holder 9, the pneumatic artificial muscle 10, and the tube joint 12 therein, and is fixed on the connecting base 4' by the clip 3'. The gas tube 2' connected to the tube joint 12 passes through the first through hole 101' of the flexible sleeve 1' and protrudes from the flexible sleeve 1 'to the outside of the flexible sleeve 1', so as to connect with an outdoor gas source.

Preferably, a hollow structure is provided at a sidewall of the flexible holder 9 corresponding to the position where the arc-shaped semi-circular hole 51 is provided.

Preferably, the flexible sleeve 1' is provided with a groove 122 for accommodating the tube joint 12, and the first through hole 101' through which the gas tube 2' passes is provided on the surface of the groove 122.

Figure 7:
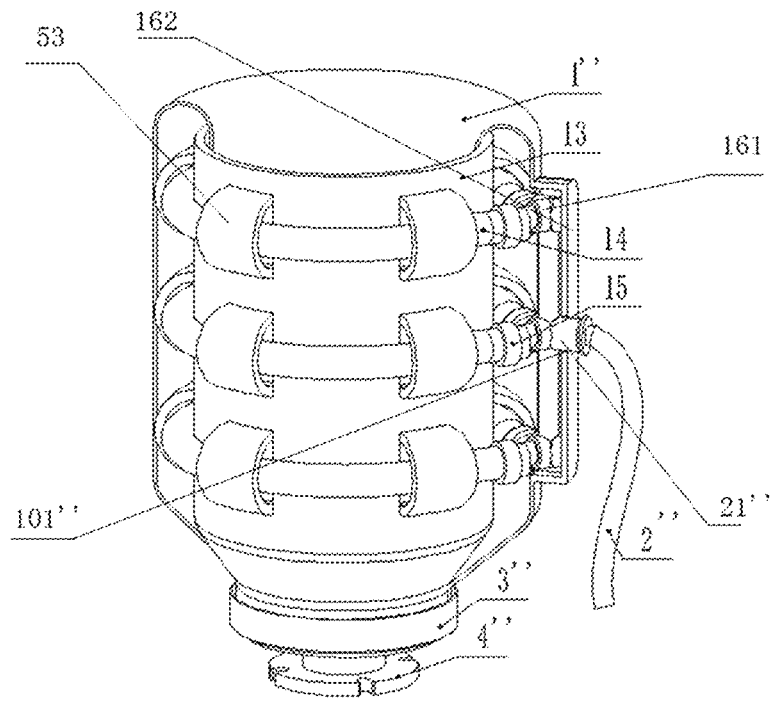
FIG. 7 is a schematic view of an internal structure of the bionic pneumatic soft gripping device according to the third embodiment of the present disclosure.
Figure 8:
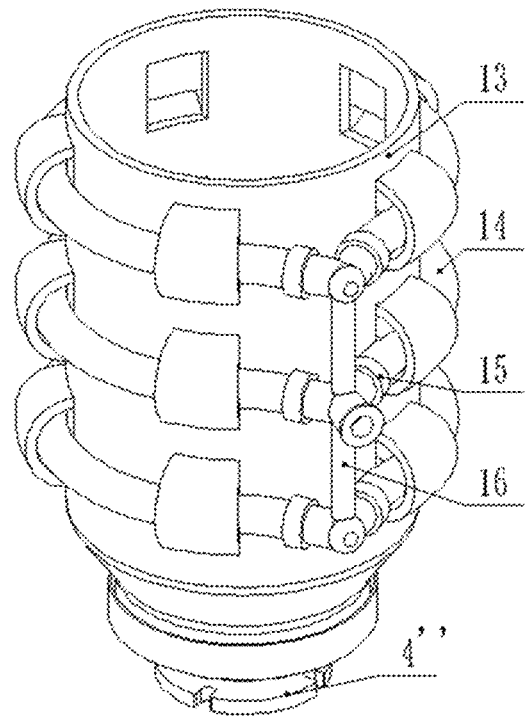
FIG. 8 is a schematic structural view of pneumatic artificial muscle winding way of the bionic pneumatic soft gripping device according to the third embodiment of the present disclosure.
Figure 9:
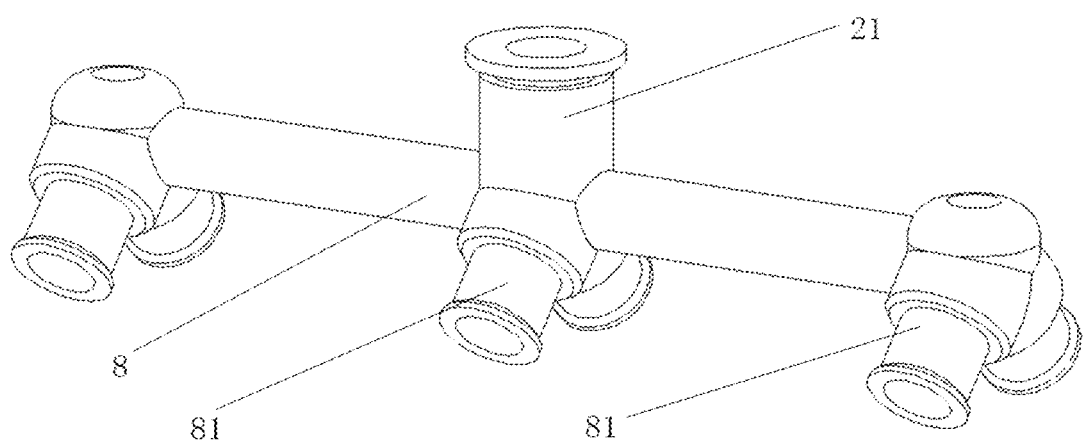
FIG. 9 is a schematic view of an internal structure of a bionic pneumatic soft gripping device according to the first and the third embodiment of the present disclosure.

According to a third embodiment of the present disclosure, a bionic pneumatic soft gripping device, as shown in FIG. 7 and FIG. 8, includes a flexible sleeve 1", a gas tube 2", a clip 3", a connecting base 4", a flexible holder 13, a pneumatic artificial muscle 14, a fastening sleeve 15, and a tube joint 16.

A first through hole 101" corresponding to a vent joint of the pneumatic artificial muscle is provided on an outer sidewall of the flexible sleeve 1", through which the gas tube 2" protrudes from the inside of the flexible sleeve 1".

Preferably, the flexible holder 13 is made of a silicone material or a rubber material. The number of pneumatic artificial muscle 14 is at least one. Preferably, there are three pneumatic artificial muscles 14 that are parallel to each other.

The flexible holder 13 is a tubular hollow structure that is open at both ends thereof. The flexible holder 13 includes first, second and third section tubular hollow members. An inner diameter of the first section tubular hollow member is smaller than an inner diameter of the third section tubular hollow member, and the first section tubular hollow member and the third section tubular hollow member are connected by a truncated cone shell, i.e., a second section tubular hollow member.

Preferably, the inner diameter of the first section tubular hollow member is 60% of the third section tubular hollow member.

Preferably, an arc-shaped semi-circular hole 53, for example, an ear-shaped hole is provided on a sidewall of the third section tubular hollow member, and a diameter of the arc-shaped semi-circular hole 53 is larger than a diameter of the pneumatic artificial muscle so that the pneumatic artificial muscle passes through and out of the arc-shaped semi-circular hole 53.

Preferably, arrangement and number of the arc-shaped semi-circular hole 53 can be designed according to the size of the articles to be grasped and the working conditions.

Preferably, the arc-shaped semi-circular holes 53 are arranged in N rows and M columns along the circumferential direction of the sidewall of the third section tubular hollow member in an axial direction of the third section tubular hollow member.

Preferably, a hollow structure is provided at a sidewall of the flexible holder 13 corresponding to the position where the arc-shaped semi-circular hole 53 is provided.

The flexible holder 13 is wound by pneumatic artificial muscles 14 arranged in parallel. The respective pneumatic artificial muscles 14 in turn pass through the respective arc-shaped semi-circular holes 53 on the corresponding row of the flexible holder 13, until each of the pneumatic artificial muscles 14 is connected from the head to the tail.

Both ends of the pneumatic artificial muscle 14 are respectively fixed on the two corresponding first interfaces 161 on the tube joints 16 by the fastening sleeves 15. The tube joint 16 and the tube joint 8 have the same principle and the similar structure, the tube joint 16 and the tube joint 8 preferably have the same structure. The flexible sleeve 1" wraps the flexible holder 13, the pneumatic artificial muscle 14, and the tube joint 16 therein, and is fixed on the connecting base 4" by the clip 3". The gas tube 2" connected to the tube joint 16 passes through the first through hole 101" of the flexible sleeve and protrudes outside.

The two ends of each pneumatic artificial muscle 14 are fixed on a corresponding first interface 161 on the tube joint 8 by the fastening sleeves 15, respectively. The tube joint 16 is provided with a second interface 21" connected with the gas tube 2. Preferably, the second interface 21" is disposed in the middle of the tube joint 16.

Preferably, the tube joint 16 is a pipe joint made of steel materials and has 2N+1 interfaces communicated with each other. The number of the first interfaces 161 is 2N, and the number of the second interfaces 21" is at least one, such that a gas source can be replaced immediately by closing and opening or closing the respective second interfaces 21" when the gas source connected to the corresponding gas tube occurs a malfunction.

Further, a switching structure is respectively arranged at each of the second interfaces 21" so as to open and close the corresponding gas source as required and when the malfunction occurs.

A second interface 21" connected to a gas tube 2" is provided on one side of the tube joint 16. The number of the first interfaces 161 is 2N, and the first interfaces 161 that have the same sizes and are connected with the interfaces on the two ends of the N pneumatic artificial muscles 14 are provided on the other side of the tube joint 161. The two first interfaces 161 as a set are respectively connected to a head portion and a tail portion of each pneumatic artificial muscle 14, and a distance between the two adjacent sets of the first interfaces 161 is identical to a distance between the two adjacent pneumatic artificial muscles 14.

The flexible sleeve 1" wraps the flexible holder 13, the pneumatic artificial muscle 14, and the tube joint 16 therein, and is fixed on the connecting base 4" by the clip 3". The gas tube connected to the tube joint 16 passes through the first through hole 101" of the flexible sleeve 1" and protrudes outside.

Preferably, the flexible sleeve 1" is provided with a groove 162 for accommodating the tube joint 16, and the first through hole 101" through which the gas tube passes is provided on the surface of the groove 162.

Figure 2:
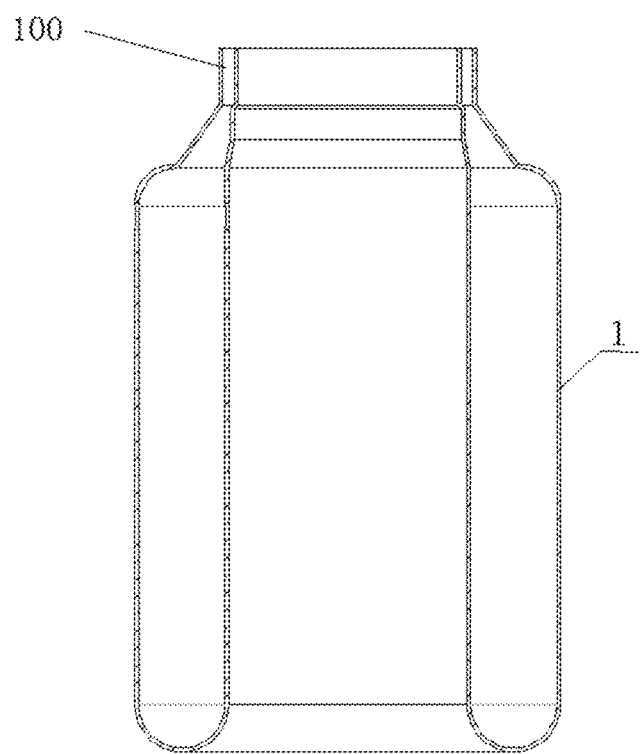
FIG. 2 is a schematic cross-sectional view of a flexible sleeve of the bionic pneumatic soft gripping device according to the present disclosure.

Further, FIG. 1 is a schematic structural view of a bionic pneumatic soft gripping device and FIG. 2 is a schematic view of the flexible sleeve. In the drawings, the device mainly includes a flexible sleeve 1, a connecting base 4, pneumatic artificial muscle, a flexible holder, and a gas tube 2 and so on. The flexible sleeve 1 is an annular jacket-like structure that is opened at the upper end and is made of the silicone material, and has a cylindrical space in the center for accommodating and gripping objects. A through hole corresponding to the vent joint of the pneumatic artificial muscle is provided at an upper portion of the outer sidewall of the flexible sleeve 1, through which the gas tube 2 protrudes. The pneumatic artificial muscle is a woven mesh reinforced type and mainly consists of a latex tube, a woven mesh, and a joint. The pneumatic artificial muscle is wound on a flexible holder, and is sleeved with a flexible sleeve at the periphery thereof. Thereby, gripping and releasing operation of the device can be achieved due to inflation and deflation of the pneumatic artificial muscle through the gas tube 2.

FIG. 5 is a perspective view of a connecting base. The connecting base 4 is a revolving shell-type structure made of the metal material. The connecting base 4 has one end that has a larger diameter and is connected to the flexible sleeve, and the other end that has a smaller diameter and is provided with a flange disk. U-shaped slots are uniformly arranged on the circumference of the flange disk.

Figure 3:
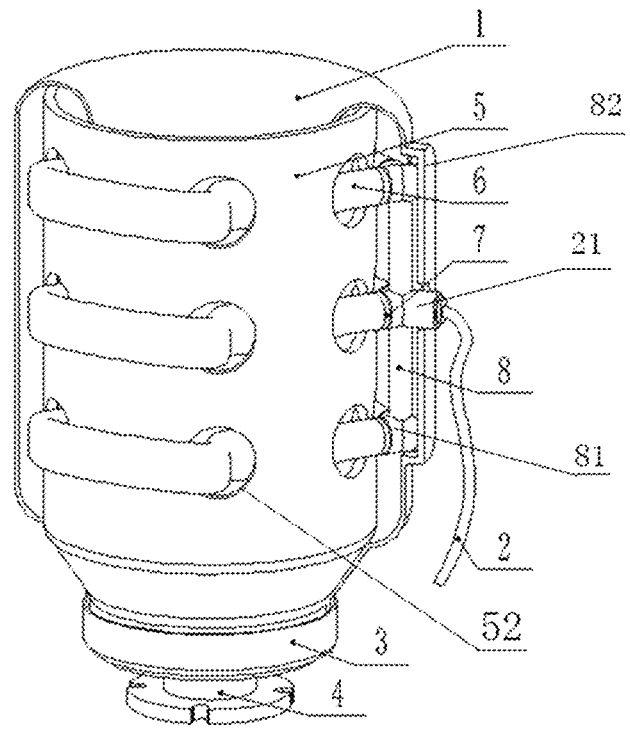
FIG. 3 is a schematic view of an internal structure of the bionic pneumatic soft gripping device of the first embodiment of the present disclosure.
Figure 4:
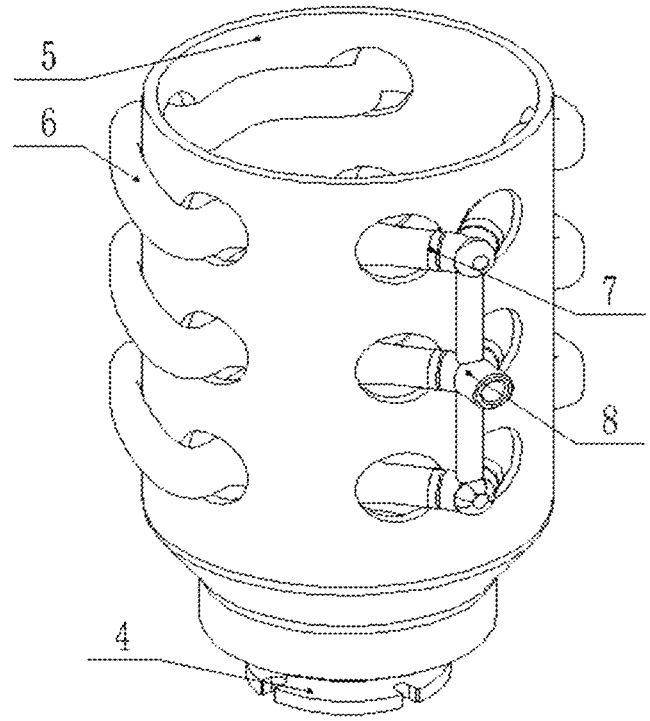
FIG. 4 is a schematic structural view of pneumatic artificial muscle winding way of a bionic pneumatic soft gripping device according to the first embodiment of the present disclosure.

The present disclosure has 4 specific configurations, and the first three specific implementations are presented as follows:

FIG. 3 and FIG. 4 are schematic view of a first type of the pneumatic soft gripping device. The device mainly includes a flexible sleeve 1, a gas tube 2, a connecting base 4, a flexible holder 5, pneumatic artificial muscle 6, a fastening sleeve 7, and a tube joint 8. The flexible holder 5 is a tubular revolving structure that is open at both ends thereof and is made of a silicone material. An inner diameter of the upper tubular cylinder is smaller than an inner diameter of the lower tubular cylinder, preferably 60% thereof. The two tubular cylinders are connected through a truncated cone shell. Circular through holes that have an equal diameter and are arranged in N rows and M columns (according to the sizes of the objects to be grasped and the working conditions) are uniformly arranged in the circumferential direction of the tubular wall of the lower section tubular cylinder. The flexible holder 5 is wound with N pneumatic artificial muscles 6 arranged in parallel. Each of the pneumatic artificial muscles 6 goes back and forth like a snake through each of the circular through holes in the corresponding rows on the flexible holder 5, until the head portion and the tail portion of the pneumatic artificial muscles are connected. The interfaces on the two ends of the pneumatic artificial muscle 6 are respectively fixed on the two interfaces corresponding to the tube joints 8 by the fastening sleeves 7. The flexible sleeve 1 wraps the flexible holder 5, the pneumatic artificial muscle 6, and the tube joint 8 therein, and is fixed on the connecting base 4 by the clip 3. The gas tube 2 connected to the tube joint 8 passes through the hole of the flexible sleeve 1 and protrudes outside.

FIG. 5 and FIG. 6 are schematic view of the second type of the pneumatic soft gripping device. The device mainly includes a flexible sleeve 1', a gas tube 2', a connecting base 4', a flexible holder 9, pneumatic artificial muscle 10, a fastening sleeve 11, and a tube joint 12. The flexible holder 9 is a tubular revolving structure that is open at both ends thereof and is made of a silicone material. An inner diameter of the upper tubular cylinder is smaller than an inner diameter of the lower tubular cylinder, preferably 60% thereof. The two tubular cylinders are connected through a truncated cone shell. arc-shaped semi-circular through holes are uniformly arranged in N rows and M columns (according to the sizes of the objects to be grasped and the working conditions) in the circumferential direction of the wall of the lower tubular cylinder. Among the two columns of transitional arc-shaped semi-circular holes, expect for the two arc-shaped semi-circular holes including one on a starting point of one column and the other one on a tailing point of the column, the remaining arc-shaped semi-circular holes of each column are arranged obliquely. The pneumatic artificial muscle 10 passes through the individual arc-shaped semi-circular holes on the first row of the flexible holder 9 in turn starting from the first arc-shaped semi-circular hole, and through the transitional oblique arc-shaped semi-circular hole, and passes through the arc-shaped semi-circular hole on the second row, and so forth, passing through all the arc-shaped semi-circular holes till to pass through the arc-shaped semi-circular hole at the end. The interfaces on the two ends of the pneumatic artificial muscle 10 are respectively fixed on the two interfaces on both ends of the tube joint 12 via the fastening sleeves 11. The tube joint 12 is a T-shaped pipe joint made of a steel material. The tube joint 12 has three joints communicated with each other, in which the middle joint is connected to the gas tube, and the joints on the two ends thereof are connected to the two end interfaces of the pneumatic artificial muscle 10. The flexible sleeve 1' wraps the flexible holder 9, the pneumatic artificial muscle 10, and the tube joint 12 therein, and is fixed on the connecting base 4' by the clip 3'. The gas tube 2' connected to the tube joint 12 passes through the hole of the flexible sleeve 1' and protrudes outside.

FIG. 7 and FIG. 8 are schematic view of the third type of the pneumatic soft gripping device. The device mainly includes a flexible sleeve 1", a gas tube 2", a connecting base 4", a flexible holder 13, pneumatic artificial muscle 14, a fastening sleeve 15, and a tube joint 16. The flexible holder 13 is a tubular revolving structure that is open at both ends thereof and is made of a silicone material. An inner diameter of the upper tubular cylinder is smaller than an inner diameter of the lower tubular cylinder, preferably 60% thereof. The two tubular cylinders are connected through a truncated cone shell. Circular through holes that have an equal diameter and are arranged in N rows and M columns (according to the sizes of the objects to be grasped and the working conditions) are uniformly arranged in the circumferential direction of the tubular wall of the lower section tubular cylinder. The flexible holder 13 is wound with N pneumatic artificial muscles 14 arranged in parallel. Each of the pneumatic artificial muscles 14 goes back and forth like a snake through each of the circular through holes in the corresponding rows on the flexible holder 13, until the head portion and the tail portion of the pneumatic artificial muscles are connected. The interfaces on the two ends of the pneumatic artificial muscle 14 are respectively fixed on the two interfaces corresponding to the tube joints 16 by the fastening sleeves 15. The tube joint 16 and the tube joint 8 have the same principle and the similar structure. The flexible sleeve 1" wraps the flexible holder 13, the pneumatic artificial muscle 14, and the tube joint 16 therein, and is fixed on the connecting base 4" by the clip 3". The gas tube 2" connected to the tube joint 16 passes through the hole of the flexible sleeve 1" and protrudes outside.

As shown in FIG. 11 to FIG. 20, the fourth specific implementations of the present disclosure are presented as follows:

The bionic pneumatic soft gripping device as shown in FIG. 11 to FIG. 20 includes a flexible sleeve 100, a gas tube 200, a connecting base 400, a flexible holder 500, a fixing piece 600, a fixing piece 700, a nut 800, a vent joint 900, and a flexible tendon flexible section 1000, a fixing piece 1100, a fixing piece 1200, a sealing joint 1300, a nut 1400, a rivet 1500, a rivet 1600, a locking ring 1700, a woven mesh 1800, and a latex tube 1900.

Figure 15:
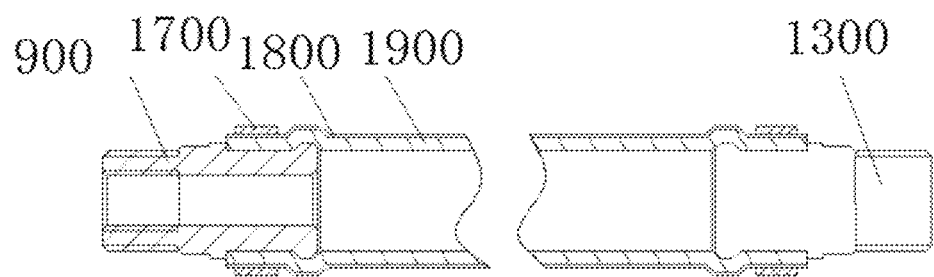
FIG. 15 is a schematic front view of the cross-sectional view of the pneumatic tendon of the bionic pneumatic flexible gripping device according to the fourth embodiment of the present disclosure.
Figure 16:
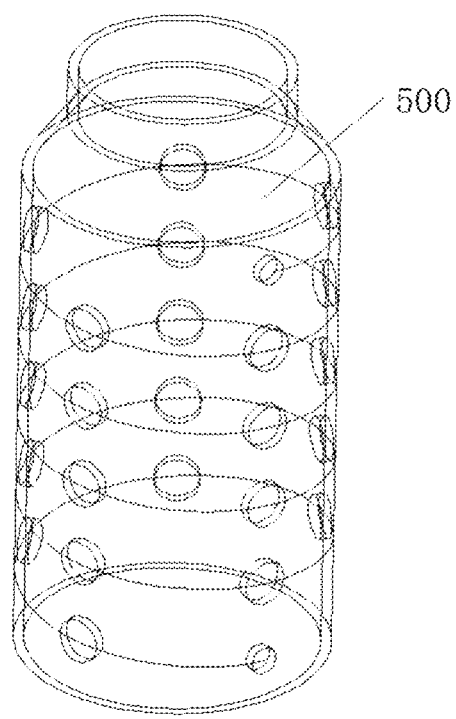
FIG. 16 is a schematic view of a joint of a head-type holder of the bionic pneumatic flexible gripping device according to the fourth embodiment of the present disclosure.
Figure 17:
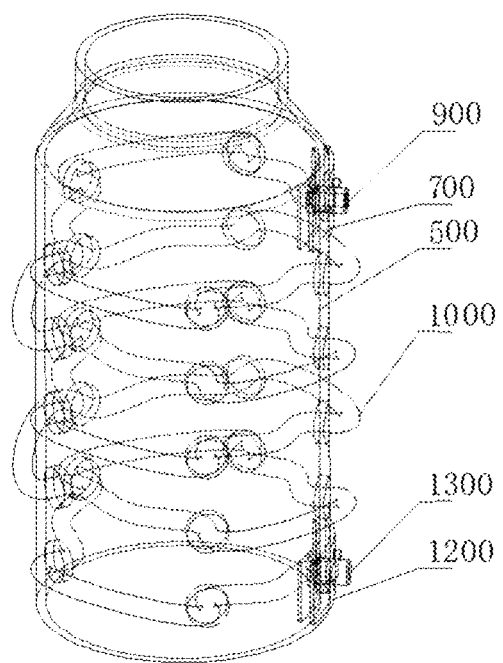
FIG. 17 is a schematic structural view of a flexible tendon mounted on a flexible holder of the bionic pneumatic flexible gripping device according to the fourth embodiment of the present disclosure.
Figure 18:
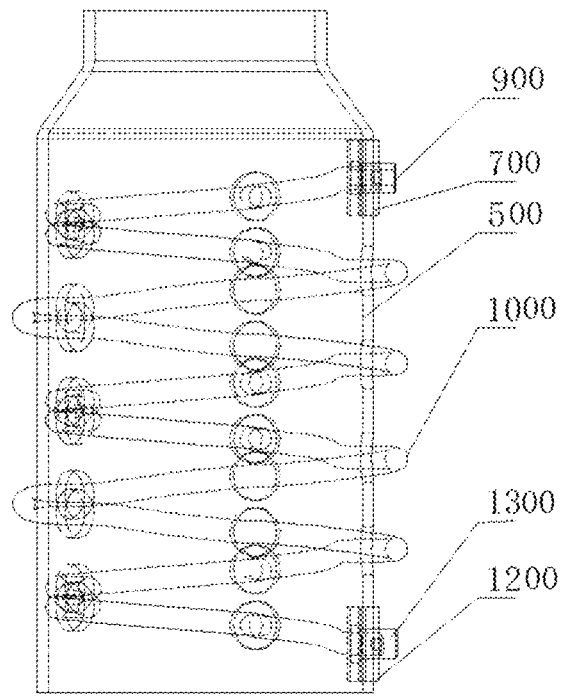
FIG. 18 is a schematic front view of a pneumatic tendon mounted on a flexible holder of the bionic pneumatic flexible gripping device according to the fourth embodiment of the present disclosure.

The flexible holder 500 is a tubular revolving structure that has openings at both ends and is made of a silicone material. An inner diameter of the upper tubular cylinder is smaller than an inner diameter of the lower tubular cylinder by 60%. The two tubular cylinders are connected through a truncated cone shell of 45°. Five columns of circular through holes that have an equal diameter and are uniformly arranged in the circumferential direction of the tubular wall of the lower section tubular cylinder, as shown in FIG. 16, the diameter of the through hole is larger than the diameter of the pneumatic artificial muscle in a maximum contraction state by 2 mm. The central axes of the through holes in each column are on the same generatrix of a cylindrical surface of the tubular wall, while all of the through holes are circumferentially arranged along a spiral line, and a distance between the central lines of two adjacent through holes in each column is twice of the diameter of the through hole. There are upper and lower connecting through holes on the wall of the lower section tubular cylinder. A fixing piece 600 and a fixing piece 700 are respectively provided on the flexible holder located on the inner and outer sides of the upper connecting through hole. The fixing piece is an arc-shaped sheet made of an aluminum alloy material, in which central through holes that have an equal diameter with a connecting through hole of the flexible holder is provided in the middle, and a fastener mounting hole is provided on both sides of the central through hole, respectively. The two fixing pieces are fixed on the flexible holder 500 by means of rivets 1500 in the mounting hole. The flexible holders 500 located at the inner and outer sides of the lower connecting through hole are respectively provided with a fixing piece 1100 and a fixing piece 1200. The fixing piece is an arc-shaped sheet made of aluminum alloy material, in which a central through hole that has an equal diameter with a connecting through hole of the flexible holder 500 is provided in the middle, and a fastener mounting hole is provided on both sides of the central through hole, respectively. The two fixing pieces are fixed on the flexible holder by means of rivets 1600 in the mounting hole. The vent joint 9 of the pneumatic artificial muscle is provided in the central through hole of the foresaid two fixing pieces. An external thread section of the vent joint protrudes from the flexible holder and is fastened by a nut 800, and the central through holes of the two fixing pieces are provided with sealing joints 1300 of the pneumatic artificial muscle, and thereby the external thread section protrudes out of the flexible holder and is fasten by the nut 1400. The pneumatic artificial muscle is a woven-mesh contractible-type flexible driver, in which the flexible tendon flexible section 1000 is a layer of woven mesh 1800 sleeved on the outside the highly elastic latex tube 1900, and has one end provided with a sealing joint made of a metal material, and the two ends of the flexible section are locked with one end of the joint by using a locking ring 1700. An axial through hole is arranged at the center of the vent joint, and is provided with an internal thread and an external thread. One end of the sealing joint is provided with the external thread. The two joints are provided with ribs on one end of the flexible section, and provided with a smooth shaft section and a shoulder in the axial middle portion thereof, as shown in FIG. 15.

As shown in FIG. 13, FIG. 14, FIG. 17 and FIG. 18, the pneumatic artificial muscle is mounted on a flexible holder, and an outer end of the sealing joint penetrates out of the connecting through hole with the fixing piece at the lower end of the flexible holder, and is fastened by a nut, and an inner end of the sealing joint is connected with one end of a flexible section of the pneumatic artificial muscle. The other end of the pneumatic artificial muscle penetrates out of the first circular through hole on the lower end of the column adjacent to the connecting through hole in a radial line direction within the flexible holder, and penetrates into the first circular through hole of the next column from the outer side of the flexible holder in the same clockwise direction, the pneumatic artificial muscle penetrates in and out till back to the second hole in the column provided with the connecting through hole, continuously through the second circular through hole in the next column in the same manner, and so forth, until the vent joint of the pneumatic artificial muscle penetrates out of the connecting through hole on the upper end of the flexible holder 500 provided with the fixing piece, and is fastened by the nut 800, so that a flexible section of the pneumatic artificial muscle 1000 and the flexible holder 500 form a spiral winding bionic structure. The internal threads of the vent joint 900 of the pneumatic artificial muscle are connected with the threaded joint on one end of the gas tube 200.

Figure 10:
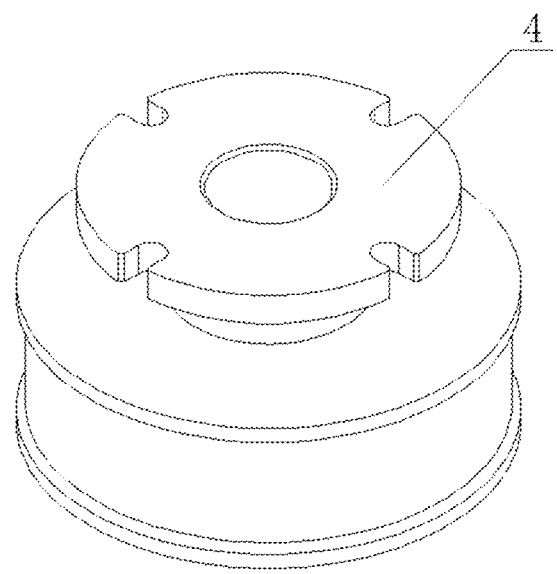
FIG. 10 is a schematic structural view of a connecting seat of the bionic pneumatic flexible gripping device according to the present disclosure.
Figure 11:
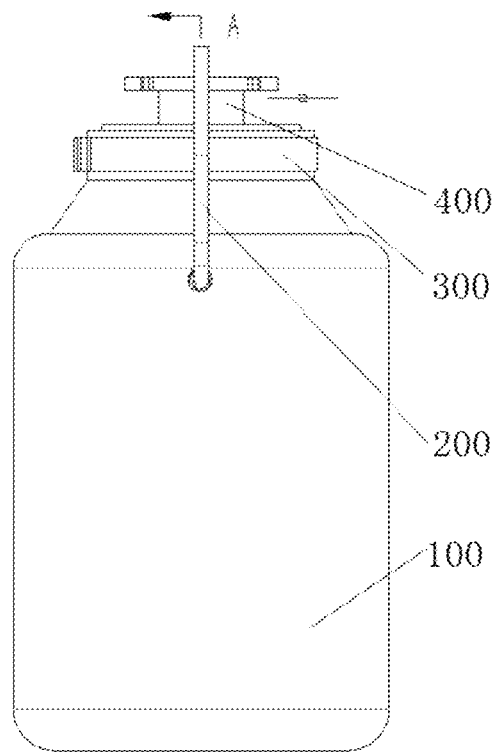
FIG. 11 is a schematic structural view of the bionic pneumatic flexible gripping device according to the fourth embodiment of the present disclosure.
Figure 12:
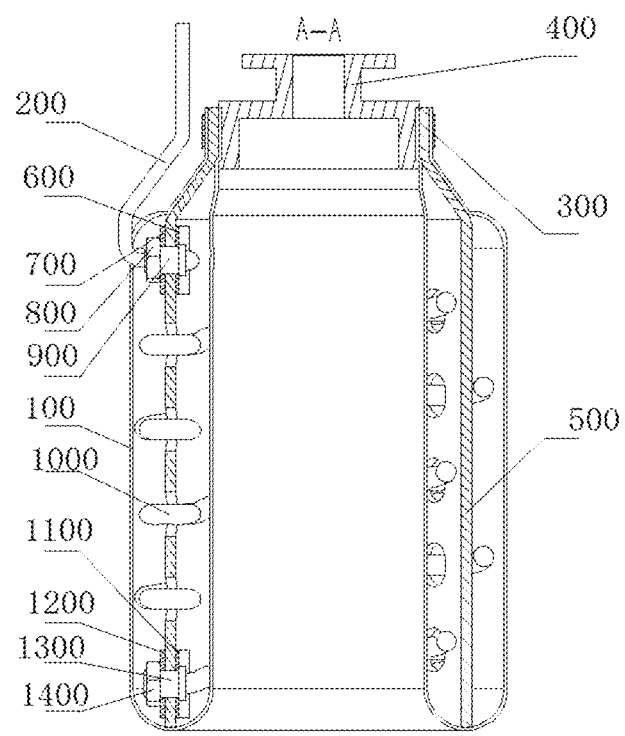
FIG. 12 is a cross-sectional view of a schematic structure view of the bionic pneumatic flexible gripping device according to the fourth embodiment of the present disclosure as shown in FIG. 11.
Figure 13:
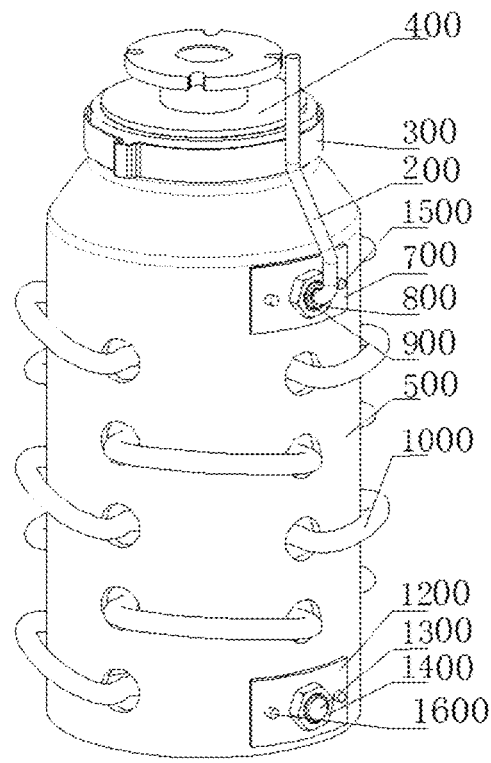
FIG. 13 is a perspective view of a non-flexible sleeve of a bionic pneumatically flexible gripping device according to the fourth embodiment of the present disclosure.
Figure 14:
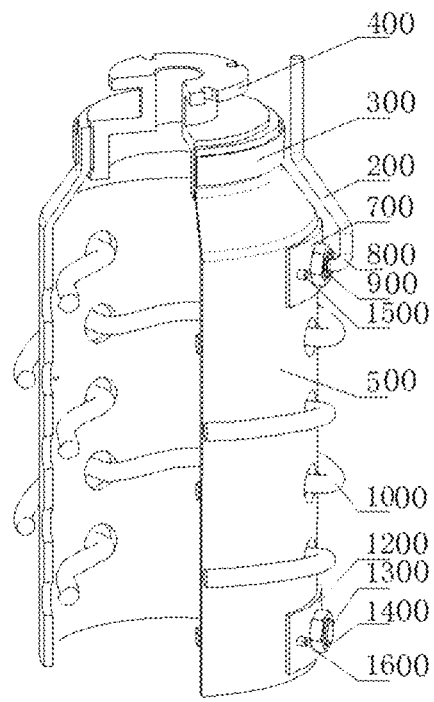
FIG. 14 is a schematic partial cross-sectional view of a non-flexible sleeve of the bionic pneumatic flexible gripping device according to the fourth embodiment of the present disclosure as shown in FIG. 13.
Figure 19:
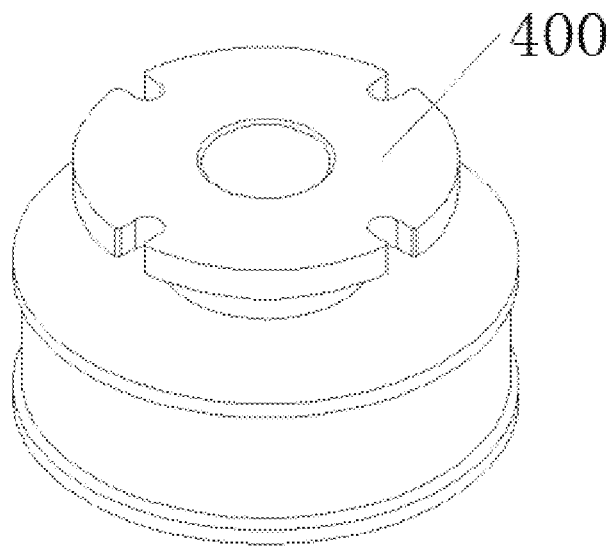
FIG. 19 is a schematic structural view of a connecting seat of the bionic pneumatic flexible gripping device according to the fourth embodiment of the present disclosure.
Figure 20:
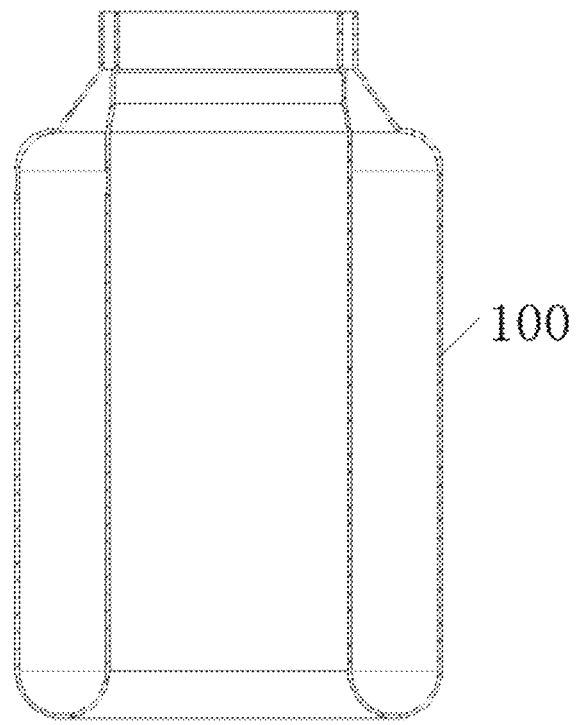
FIG. 20 is a schematic front view of the sectional view of a head-type sleeve of the bionic pneumatic flexible gripping device according to the fourth embodiment of the present disclosure.

As shown in FIG. 12, the spiral winding bionic structure is sleeved with a flexible sleeve 100. As shown in FIG. 10, the flexible sleeve is an annular jacket-like structure that is open at the upper end and is made of a silicone material, and has a cylindrical space at the center thereof. Through holes corresponding to the vent joints of the pneumatic artificial muscle are provided on the upper portion of the outer sidewall in the flexible sleeve. The spiral winding bionic structure and the upper portion of the flexible sleeve are sleeved on a large-diameter circumferential wall of the connecting base 400. A rib is provided on the large-diameter circumferential wall and fastened by a clip 300. The connecting base, as shown in FIG. 19, is a revolving shell-type structure made of a metal material. One end of the large-diameter circumferential wall of the connecting base is connected to the flexible sleeve. One end of the small-diameter circumferential wall of the connecting base is provided with a flange disk. Four U-shaped slots uniformly arranged in circumferential direction are provided on the flange disk.

The gripping operation of the present disclosure is described as follows: when the object is grasped, the pneumatic tendon is inflated to be shortened and thicker, and thereby wraps the flexible holder and the inner wall of the flexible sleeve, so that the inner cavity of the flexible sleeve is contracted to grip the object tightly; when the object is released, the pneumatic tendon is deflated to be restored to the initial state, and the object is released under the action of the elastic force of the flexible holder and the flexible sleeve.

The pneumatic tendon of the bionic pneumatic flexible gripping device of the present disclosure can provide a greater contraction force. The pneumatic tendon is an annular closed structure to form a multi-point contact force for enclosing gripping. In an inflated state, the internal cavity of the pneumatic tendon forms pleats and projections for blocking the grasped object. The pneumatic tendon after inflation has a higher rigid to withstand a large load. Furthermore, the flexible sleeve is made of the silicone material, and thereby having a larger friction coefficient and can ensure to have a greater friction force with the object to be gripped.

ADVANTAGEOUS EFFECTS OF THE PRESENT DISCLOSURE

As compared with the prior art, the bionic pneumatic soft gripping device according to the present disclosure has following advantages:

1) Safety: as for the bionic pneumatic soft gripping device of the present disclosure, the main body of the gripping structure is made of flexible materials, for example, silicone, latex tubes, fibers, in which only a small part of the main body, for example, a connecting base, tube joints and joints of the pneumatic artificial muscles, are rigid parts and wrapped by a flexible sleeve, and thereby having a greater man-machine safety.

2) Economy: manufacturing process adopts an injection molding process, a metal processing process, standard parts are used, and the materials used are cheap.

3) Simplicity: a modular design is used in the present disclosure to complete the manufacture by using fewer parts through simple assembling operation, and facilitate for maintenance and replacement.

4) Large Gripping Force: the woven mesh pneumatic artificial muscle which form a annular closed structure has great load capability and the silicone flexible sleeve have high friction coefficient, such that the present disclosure has a great gripping capacity of the present disclosure.

5) High Adaptability: the present disclosure provides a contraction wrapped gripping method which has a good compliancy, and can grip the objects in various shapes within the gripping sizes, and thereby being used widely.

It should be appreciated that although embodiments of the present disclosure were described above, these are just examples and do not limit the present disclosure. It should be understood for the person skilled in the art that the technical solutions as mentioned in the foresaid embodiments of the present disclosure may be modified in various ways, alternatively, a part of or all of the technical features may be substituted equivalently. However, these modifications or substitutions do not essentially depart from the scope of the corresponding technical solutions of the respective embodiments of the present disclosure.

What is claimed is:

1. A bionic pneumatic soft gripping device, comprising: a flexible sleeve, a connecting base, a pneumatic artificial muscle, a flexible holder, and a gas tube,
wherein the flexible holder is a tubular revolving structure opening at both ends; an inner diameter of an upper section tubular cylinder of the flexible holder is smaller than an inner diameter of a lower section tubular cylinder of the flexible holder; the upper section tubular cylinder and the lower section tubular cylinder are connected through a truncated cone shell; four to nine columns of vertically-arrayed circular through holes equal in diameter are uniformly arranged in a circumferential direction on a tubular wall of the lower section tubular cylinder;
wherein an upper connecting through hole and a lower connecting through hole are respectively arranged on the tubular wall of the lower section tubular cylinder; the flexible holder is provided with two fixing pieces located respectively on an inner side and an outer side of each of the connecting through holes; the fixing piece is an arc-shaped sheet made of a metal material and is provided with a central through hole in the middle thereof that is equal in diameter with the connecting through holes of the flexible holder; and a fastener mounting hole is respectively provided on either side of the central through hole; the two fixing pieces are fixed on the flexible holder by means of a fastener in the fastener mounting hole; a vent joint of the pneumatic artificial muscle is provided in the central through hole of the fixing piece; sealing joints of the pneumatic artificial muscle are provided in the central through holes of the two fixing pieces below; internal threads of the vent joint of the pneumatic artificial muscle are connected with a threaded joint on one end of the gas tube; the vent joint of the pneumatic artificial muscle penetrates out of the connecting through hole with the fixing pieces on an upper end of the flexible holder, so that a flexible section of the pneumatic artificial muscle and the flexible holder together form a spiral winding bionic structure;
wherein the spiral winding bionic structure is sleeved from outside with the flexible sleeve; the flexible sleeve is an annular jacket-like structure that has an opening on an upper end thereof and is made of a silicone material, and has a cylindrical space at the center thereof; through holes corresponding to the vent joints of the pneumatic artificial muscle are provided on an upper portion of an outer sidewall of the flexible sleeve; and
wherein the spiral winding bionic structure and the upper portion of the flexible sleeve are sleeved on a large-diameter circumferential wall of a connecting base; one end of a small-diameter circumferential wall of the connecting base is provided with a flange disk.

2. The bionic pneumatic soft gripping device according to claim 1, wherein a diameter of the circular through hole is larger than a diameter of the pneumatic artificial muscle in a maximum contraction state by 2-4 mm; central axes of the circular through holes in each column are on the same generatrix of a cylindrical surface of the tubular wall, while all of the circular through holes are circumferentially arranged along a spiral line; and a distance between central lines of two adjacent circular through holes in each column is 2-3 times of the diameter of the circular through hole; and the flexible holder is made of a silicone material.

3. The bionic pneumatic soft gripping device according to claim 2, wherein a center of the vent joint is provided an axial through hole that is provided with internal threads and external threads; external threads are provided on one end of the sealing joint; the sealing joint has an outer end that penetrates out of the connecting through hole with the fixing pieces of the flexible holder, and an inner end that is connected with the flexible section of the pneumatic artificial muscle; the other end of the pneumatic artificial muscle penetrates from the inner side of the flexible holder along the spiral line out of a first circular through hole of the circular through holes on the lower end of the column adjacent to the connecting through hole, and penetrates into a first circular through hole of the circular through holes in the next column from the outer side of the flexible holder in the same clockwise direction; the pneumatic artificial muscle penetrates in and out till back to a second circular through hole of the circular through holes in the column provided with the connecting through hole, and continuously through a second circular through hole of the circular through holes in the next column in the same manner.

4. The bionic pneumatic soft gripping device according to claim 3, wherein the connecting base is a revolving shell-type structure made of a metal material; one end of a large-diameter circumferential wall of the connecting base is connected to the flexible sleeve; and the flange disk is provided with U-shaped slots uniformly arranged in the circumferential direction.

5. The bionic pneumatic soft gripping device according to claim 4, wherein the pneumatic artificial muscle is a woven-mesh contractible-type flexible driver; the flexible section of the pneumatic artificial muscle is a layer of woven mesh sleeved outside of a highly elastic latex tube; the flexible section has one end on which the vent joint of the metal material is provided and the other end on which the sealing joint of the metal material; and the two ends of the flexible section are locked by using a locking ring.

6. The bionic pneumatic soft gripping device according to claim 4, wherein either of the vent joint and the sealing joint is provided with a rib on one end thereof within the flexible section, and provided with a smooth shaft section and a shoulder in an axial middle portion thereof.

7. The bionic pneumatic soft gripping device according to claim 4, wherein the large-diameter circumferential wall of the connecting base is provided with a rib, and the spiral winding bionic structure and the flexible sleeve are fixed on the rib by means of a clip.

8. A bionic pneumatic soft gripping device, comprising:
a flexible sleeve, a gas tube, a connecting base, a flexible holder, a pneumatic artificial muscle, a fastening sleeve and a tube joint;
wherein the flexible sleeve is an annular jacket-like structure configured to ensure a friction force between the flexible sleeve and an object to be grasped within a preset range; a center of the flexible sleeve is a cylindrical structure with an opening at a first end thereof;
wherein the flexible holder is a tubular hollow structure opening at both ends thereof and includes a first section tubular hollow member, a second section tubular hollow member and a third section tubular hollow member; an inner diameter of the first section tubular hollow member is smaller than an inner diameter of the third section tubular hollow member, and the first section tubular hollow member and the third section tubular hollow member are connected by the second section tubular hollow member in a shape of a truncated cone;
wherein the connecting base has a first end connected to the flexible holder and a second end connected to the flange disk;
wherein the pneumatic artificial muscle is wound on the flexible holder; the flexible sleeve is sleeved on the flexible holder connected with the pneumatic artificial muscle through the opening of the flexible sleeve; a cylindrical structure at a center of the flexible sleeve is used to receive and grip the object to be grasped; the flexible sleeve is fixed to the connecting base by means of a clip; the pneumatic artificial muscle is connected to the tube joint by means of the fastening sleeve; the tube joint is connected to the gas tube; a first through hole corresponding to a vent joint of the pneumatic artificial muscle is provided on an outer sidewall of the flexible sleeve; the gas tube is projected from inside of the flexible sleeve; gripping or releasing operation is realized by inflating or deflating gas to the pneumatic artificial muscle via the gas tube; and
wherein the pneumatic artificial muscle comprises a latex tube, a woven mesh tube, and a joint; the joint is a rigid structure; the woven mesh tube is sleeved on a periphery of the latex tube; two ends of the woven mesh tube and the latex tube are fixedly mounted on the joint; the woven mesh tube is made of reinforced fibers; the pneumatic artificial muscle forms an annular closed structure on the flexible holder to form a multi-point contact force for enclosing gripping; and
wherein in an inflated state, the pneumatic artificial muscle tightens the flexible sleeve and the flexible holder to allow an internal cavity of the pneumatic artificial muscle to form pleats and projections for blocking the grasped object; and an inner diameter of the first section tubular hollow member is 60% of an inner diameter of the third section tubular hollow member.

9. The bionic pneumatic soft gripping device according to claim 8, wherein the connecting base comprises a revolving shell, and U-shaped slots uniformly arranged in a circumferential direction are arranged on an edge of the flange disk; the connecting base is a rigid structure made of a metal material.

10. The bionic pneumatic soft gripping device according to claim 8, wherein second through holes are provided on a sidewall of the third section tubular hollow member; a diameter of the second through hole is larger than a diameter of the pneumatic artificial muscle so that the pneumatic artificial muscle penetrates in and out of the second through holes;
wherein the second through holes are circular through holes equal in diameter and uniformly arranged in N rows and M columns along a circumferential direction of the sidewall of the third section tubular hollow member;
wherein at least one set of pneumatic artificial muscles are arranged in parallel in an axial direction of the third section tubular hollow member; the pneumatic artificial muscles respectively penetrate in and out of two second through holes adjacent to each other within a plane in which the respective pneumatic artificial muscles are located in perpendicular to an axis of the third section tubular hollow member; each of the pneumatic artificial muscles goes back and forth like a snake through each of the second through holes on the flexible holder in a row on which the respective pneumatic artificial muscles are located, until head portions and tail portions of the respective pneumatic artificial muscles are connected;
wherein two ends of each of the pneumatic artificial muscles are fixed on a corresponding first interface on the tube joint by the fastening sleeves, respectively; the tube joint is provided with a second interface connected with the gas tube; the tube joint has 2N+1 interfaces communicated with each other; and
wherein the number of the first interfaces is 2N, and the number of the second interfaces is at least one, such that a gas source can be replaced immediately when the gas source connected to a first gas tube occurs malfunction.

11. The bionic pneumatic soft gripping device according to claim 8, wherein arc-shaped semi-circular holes are provided on the sidewall of the third section tubular hollow member; a diameter of the arc-shaped semi-circular hole is larger than a diameter of the pneumatic artificial muscle so that the pneumatic artificial muscle penetrates in and out of the arc-shaped semi-circular hole;
wherein the arc-shaped semi-circular holes are arranged in N rows and M columns along the circumferential direction of the sidewall of the third section tubular hollow member in an axial direction of the third section tubular hollow member; a first arc-shaped semi-circular hole in a transitional column is arranged transversally, and the rest of arc-shaped semi-circular holes in the transitional column are arranged obliquely; the pneumatic artificial muscle is a long tube, which passes through the individual arc-shaped semi-circular holes on a first row of the flexible holder in turn starting from the first arc-shaped semi-circular hole of the transitional column, and through the rest of arc-shaped semi-circular holes arranged obliquely in the transitional column, and passes through the arc-shaped semi-circular holes on a second row, and so forth, passes through all the arc-shaped semi-circular holes till to pass through the arc-shaped semi-circular hole at the end;

wherein both ends of the pneumatic artificial muscle are respectively fixed on two first interfaces on both ends of the tube joint via the fastening sleeve; a second interface connected with the gas tube is provided on the tube joint; the tube joint has three joints communicated with each other; a hollow structure is provided at the sidewall of the flexible holder corresponding to the position in which the arc-shaped semi-circular hole is provided; the tube joint comprises a first portion, a second portion, and a third portion; the first portion is a straight tube, and the second portion and the third portion are bent tubes; and wherein an end of the second portion is in a direction opposite to an end of the third portion; two ends of the pneumatic artificial muscle are respectively connected to the end of the second portion and the end of the third portion via the fastening sleeves, in order to reduce deformation of the pneumatic artificial muscle, such that the gas can smoothly flow within the pneumatic artificial muscle.

12. The bionic pneumatic soft gripping device according to claim 11, wherein the second portion includes a first section, a second section, and a third section; the second section is arranged perpendicular to the first section; the third section is arranged perpendicular to the first section; a plane in which the first section and the second section are located does not coincide with a plane where the first section and the third section are located; and there is an included angle between the two planes.

13. The bionic pneumatic soft gripping device according to claim 8, wherein arc-shaped semi-circular holes are provided on the sidewall of the third section tubular hollow member; a diameter of the arc-shaped semi-circular hole is larger than a diameter of the pneumatic artificial muscle so that the pneumatic artificial muscle penetrates in and out of the arc-shaped semi-circular holes;

wherein the arc-shaped semi-circular holes are uniformly arranged in N rows and M columns along the circumferential direction of the sidewall of the third section tubular hollow member in an axial direction of the third section tubular hollow member;

wherein a hollow structure is provided at a sidewall of the flexible holder corresponding to the position where the arc-shaped semi-circular hole is provided; the flexible holder is wound by N pneumatic artificial muscles arranged in parallel; the respective pneumatic artificial muscles in turn pass through the respective arc-shaped semi-circular holes on a corresponding row of the flexible holder, until each of the pneumatic artificial muscles is connected from a head portion to a tail portion;

wherein both ends of the pneumatic artificial muscle are respectively fixed on two corresponding first interfaces on the tube joints by the fastening sleeves, respectively; the tube joint is provided with a second interface connected with the gas tube; and wherein the tube joint has 2N+1 interfaces communicated with each other; the number of the first interfaces is 2N, and the number of the second interfaces is at least one, such that a gas source can be replaced immediately when the gas source connected to the corresponding gas tube occurs malfunction.

\* \* \* \* \*